(12) United States Patent
Kim et al.

(10) Patent No.: US 8,871,323 B2
(45) Date of Patent: *Oct. 28, 2014

(54) VACUUM INSULATION MEMBER, REFRIGERATOR HAVING VACUUM INSULATION MEMBER, AND METHOD FOR FABRICATING VACUUM INSULATION MEMBER

(75) Inventors: Youngbae Kim, Changwon-si (KR); Dongju Jung, Changwon-si (KR); Ilseob Yoon, Changwon-si (KR); Minkyu Hwang, Changwon-si (KR); Jinwoo Shim, Changwon-si (KR); Kyungdo Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 170 days.

This patent is subject to a terminal disclaimer.

(21) Appl. No.: 13/386,965

(22) PCT Filed: Aug. 6, 2010

(86) PCT No.: PCT/KR2010/005179
§ 371 (c)(1),
(2), (4) Date: Jan. 25, 2012

(87) PCT Pub. No.: WO2011/016698
PCT Pub. Date: Feb. 10, 2011

(65) Prior Publication Data
US 2012/0118002 A1    May 17, 2012

(30) Foreign Application Priority Data

Aug. 7, 2009  (KR) .................. 10-2009-0072990

(51) Int. Cl.
*F16L 59/065* (2006.01)
*F25D 23/06* (2006.01)

(52) U.S. Cl.
CPC ............ *F25D 23/06* (2013.01); *F25D 2201/14* (2013.01); *F16L 59/065* (2013.01)
USPC ......................................................... 428/69

(58) Field of Classification Search
CPC ................................ F16L 59/065; E04B 1/803
USPC .......................................................... 428/69
See application file for complete search history.

(56) References Cited

FOREIGN PATENT DOCUMENTS

| JP | 2004-011705 A | 1/2004 |
|----|---------------|--------|
| JP | 2006-002920 A | 1/2006 |
| JP | 2007-278388 A | 10/2007 |
| KR | 10-066479 B1  | 1/2007 |

OTHER PUBLICATIONS

International Search Report and Written Opinion dated Mar. 21, 2011 issued in Application No. PCT/KR2010/005179.

*Primary Examiner* — Alexander Thomas
(74) *Attorney, Agent, or Firm* — KED & Associates, LLP (57) ABSTRACT

Disclosed are a vacuum insulation member, a refrigerator having a vacuum insulation member, and a method for fabricating a vacuum insulation member. The vacuum insulation member includes: an envelope having gas impermeability and having a certain decompressed space therein; a core formed as a structure for maintaining a certain shape and disposed at an inner side of the envelope to support the envelope; and a filler formed as powder having micro pores and filled at the inner side of the envelope. The use of a glass fiber core can be avoided, an internal vacuum degree can be easily maintained, and a life span can be lengthened.

18 Claims, 7 Drawing Sheets

VACUUM INSULATION MEMBER, REFRIGERATOR HAVING VACUUM INSULATION MEMBER, AND METHOD FOR FABRICATING VACUUM INSULATION MEMBER

TECHNICAL FIELD

The present invention relates to a vacuum insulation member, a refrigerator having a vacuum insulation member, and a method for fabricating a vacuum insulation member, and more particularly, to a vacuum insulation member having a uniform insulation thickness, a refrigerator having a vacuum insulation member, and a method for fabricating a vacuum insulation member.

BACKGROUND ART

In general, a vacuum insulation member is a sort of insulator decompresses an internal s pace into a vacuum state to thus use the characteristics of low thermal conductivity of vacuum. The vacuum insulation member may be implemented in the form of a panel having a certain thickness.

The vacuum insulation panel may be configured to include an envelope forming a certain space therein and a core accommodated at an inner side of the envelope and supporting such that the envelope to maintain the certain space. In addition, a getter for absorbing an internal gas of the envelope may be provided at the inner side of the envelope.

The envelope (e.g., a film member), serving to maintain an internal vacuum degree of the vacuum insulation member at a certain level, is formed of a film formed by laminating multi-layered polymers and aluminum, or the like.

As the core, glass fiber, silica core, or the like, is used. Among them, glass fiber is commonly used because its excellent initial performance is excellent and its cost is low. However, glass fiber needs a preprocessing process and weak durability.

The getter is a sort of aspirator or an absorbent for absorbing gas and/or moisture which is present at the inner side of the envelope or newly introduced.

DISCLOSURE OF INVENTION

Technical Problem

In the related art vacuum insulation member, in order to maintain an internal vacuum degree at a pre-set level, much cost and efforts are required to fabricate an envelope, increasing the cost.

In addition, because the core is formed of glass fiber, it is not easy to handle the core, and in order to insert the core into the interior of the envelope, the core needs to undergo a preprocessing process (e.g., hot pressing or needle punching) in order to reduce the volume and size of the core. This results in problems in that the cost increases, much time is required, and the productivity is degraded.

In addition, because glass fiber is used as the core at the inner side of the envelope, and in this case, a relatively high vacuum degree must be maintained in terms of glass fiber, so much equipment, time and efforts are required. In order to maintain the interior of the envelope at a very high vacuum degree, a film formed by laminating a metal (e.g., aluminum) having a very low air permeability is used. However, a heat transmission is generated through the metal (aluminum)-laminated layer, degrading the performance.

In spite of the efforts for fabricating the envelope as described above, in the related art vacuum insulation member, it is difficult to fabricate it because the internal vacuum degree must be maintained to be relatively high, and also, because the vacuum degree is damaged to a certain degree (about 0.1 Torr/year) after the fabrication, it is difficult to maintain the internal vacuum degree. Thus, the insulation performance is not properly maintained to shorten the life span.

Also, because the vacuum insulation member has a non-uniform thickness, making it difficult to obtain a uniform insulation thickness. This results in a problem in which the thickness of an insulation wall increases overall.

In addition, after the vacuum insulation member is fabricated, the surface of the envelope is creased, making the surface of the envelope uneven, so a defective attachment (or bonding) problem arises when the vacuum insulation member is bonded to an object.

Solution to Problem

Therefore, in order to address the above matters, the various features described herein have been conceived.

An aspect of the present invention provides a vacuum insulation member capable of simplifying a preprocessing process of a core, a refrigerator having the vacuum insulation member, and a method for fabricating the vacuum insulation member.

Another aspect of the present invention provides a vacuum insulation member capable of easily maintaining an internal vacuum degree and lengthening a life span, a refrigerator having the vacuum insulation member, and a method for fabricating the vacuum insulation member.

Another aspect of the present invention provides a vacuum insulation member capable of obtaining a uniform insulation thickness, a refrigerator having the vacuum insulation member, and a method for fabricating the vacuum insulation member.

Another aspect of the present invention provides a vacuum insulation member capable of restraining a generation of creases on an outer surface and reducing a defective attachment, a refrigerator having the vacuum insulation member, and a method for fabricating the vacuum insulation member.

According to an aspect of the present invention, there is provided a vacuum insulation member including: an envelope having gas impermeability and having a certain decompressed space therein; a core formed as a structure for maintaining a certain shape and disposed at an inner side of the envelope to support the envelope; and a filler formed as powder having micro pores and filled at the inner side of the envelope.

The core may be configured to have a honeycomb structure.

The core may be configured to have the shape of a rectangular parallelepiped with an empty interior thereof.

Ribs may be disposed in a thicknesswise direction at the inner side of the core.

A plurality of ribs may be formed to be disposed at a right angle to each other.

The core may be formed by laminating mesh members having a certain mesh.

The core may be made of a synthetic resin material through injection molding.

The filler may include at least one of $SiO_2$, $TiO_2$, and $Al_2O_3$.

An internal vacuum degree of the envelope may range from $10^{-1}$ Torr to 10 Torr.

The envelope may be configured to include a film and a deposition film having a metal or inorganic deposition layer deposited on a surface of the film.

The vacuum insulation member may further include: a getter disposed at the inner side of the envelope.

According to another aspect of the present invention, there is provided a refrigerator having the vacuum insulation member.

According to another aspect of the present invention, there is provided a method for fabricating a vacuum insulation member, including: forming an envelope having gas impermeability and a core formed as a structure for maintaining a certain shape and disposed at an inner side of the envelope to support the envelope; filling a filler formed as powder having micro pores at the inner side of the envelope; and decompressing the interior of the envelope to maintain the interior of the envelope at a certain vacuum degree.

Advantageous Effects of Invention

According to exemplary embodiments of the present invention, because the core formed as a structure for maintaining a certain shape is provided, the use of a glass fiber core which needs to under a preprocessing process, for which much equipment and time are required, can be avoided, and thus, the fabrication can be facilitated and the fabrication cost can be reduced.

In addition, because the core formed as a structure and the filler formed as powder having micro pores are provided at the inner side of the envelope, the internal vacuum degree required for an insulation performance can be lowered to $10^{-1}$ Torr to 10 Torr. Thus, equipment (the number of vacuum pumps) required for the internal vacuum degree and a tact time can be considerably reduced. Accordingly, the fabrication can be quickly and easily performed, and the fabrication cost can be significantly reduced.

In addition, because the envelope is supported by the structure, the completed vacuum insulation member can have a uniform thickness. Thus, the thickness of an insulation wall including the vacuum insulation member can be reduced.

In addition, because the envelope is supported by the core formed as a structure having a certain shape, a generation of creases on the surface of the envelope after the interior of the envelope is decompressed (exhausted) can be considerably restrained. Thus, when the vacuum insulation member is attached to a surface of an object, a generation of a defective bonding that the vacuum insulation member is separated from the surface of the object resulting from its expansion according to an introduction of a foaming agent into a gap between creases of the envelope can be considerably reduced.

The foregoing and other objects, features, aspects and advantages of the present invention will become more apparent from the following detailed description of the present invention when taken in conjunction with the accompanying drawings.

BEST MODE FOR CARRYING OUT THE INVENTION

Exemplary embodiments of the present invention will now be described in detail with reference to the accompanying drawings.

Figure 1:
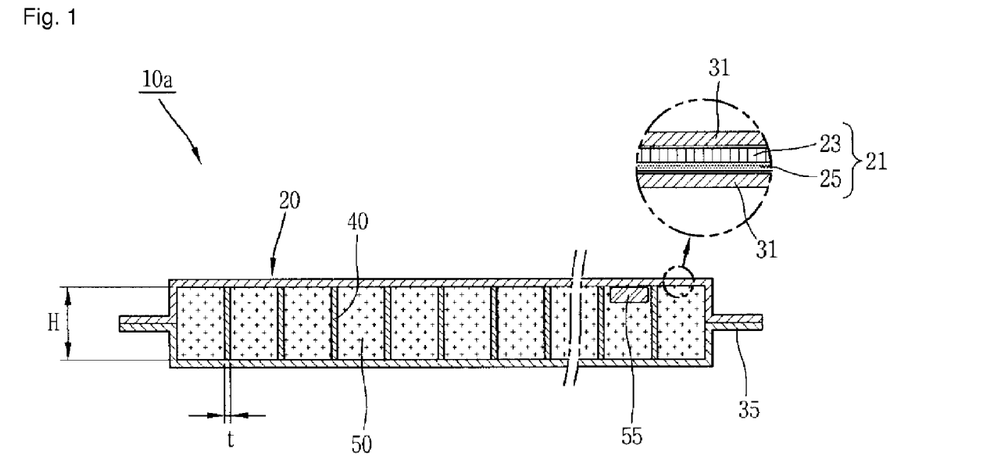
FIG. 1 is a sectional view showing a vacuum insulation member according to a first exemplary embodiment of the present invention.
Figure 2:
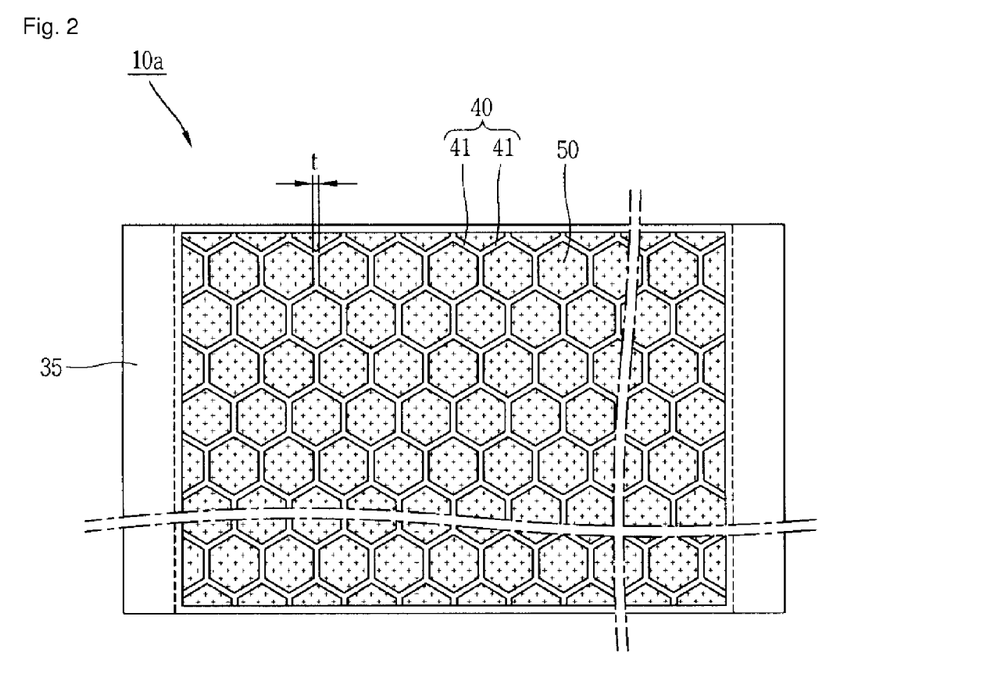
FIG. 2 is a plan and sectional view of FIG. 1.

FIG. 1 is a sectional view showing a vacuum insulation member according to a first exemplary embodiment of the present invention, and FIG. 2 is a plan and sectional view of FIG. 1.

As shown in FIG. 1, a vacuum insulation member 10a according to the present exemplary embodiment includes an envelope 20 having gas impermeability and having a certain decompressed space therein; a core 40 formed as a structure for maintaining a certain shape and disposed at an inner side of the envelope 20 to support the envelope 20; and a filler 50 formed as powder having micro pores and filled at the inner side of the envelope 20. Here, the decompressed space may be a space in which internal pressure is decompressed to be lower than atmospheric pressure.

The envelope 20 may be configured to having an anti-air permeability or gas impermeability in order to form a decompressed space having a certain vacuum degree therein. The envelope 20 may include a plurality of films 21 and 31 which are laminated to each other. A junction part 35 may be formed on at least one side of the envelope 20 by bonding the films 21 and 31 at upper and lower sides after the core 40 is accommodated.

The envelope 20 may be configured to include a film main body 23 formed as a synthetic resin film having gas impermeability and a deposition layer 25 formed by depositing a metal (e.g., aluminum (Al)) or an inorganic material (e.g., silica) on the surface of the film main body 23. Here, the film main body 23 may be made of ethylene vinyl alcohol having good gas blocking performance (i.e., gas impermeability).

The envelope 20 may further include resin films 31 having excellent chemical resistance disposed at an outer side and/or at an inner side of the deposition film 21. The resin films 31 may be made of polypropylene having excellent chemical resistance.

A getter 55 may be provided at the inner side of the envelope 20 in order to absorb a gas remaining at the inner side of the envelope 20 or a gas introduced into the interior of the envelope 20 from an outside. The getter 55 may be configured to include at least one of BaLi, CoO, BaO, and CaO in order to absorb oxygen, hydrogen, nitrogen, carbon dioxide, and vapor. Here, the getter 55 may be configured to have the shape of a certain block or a rectangular parallelepiped. Also, the getter 55 may be coated on an inner surface of the envelope or the surface of the core 20.

The core 40 for supporting the envelope 20 may be provided at the inner side of the envelope 20 in order to form and support a decompressed space. The core 40 may be formed as a structure for maintaining a certain shape. The core 40 may be made of a synthetic resin material, plastic, paper, glass, a mineral material, and the like. Accordingly, the use of a glass fiber core can be avoided. Namely, a preprocessing process (e.g., hot pressing or needle punching, and the like), for which much equipment and much time are required, is not necessarily performed to reduce the size and volume of the glass fiber core resulting from the use of the glass fiber core, so the fabrication can be quickly and easily performed at a low cost.

As shown in FIG. 2, the core 40 may have a honeycomb structure having a plurality of hexagonal cells 41. The length of one side of the cell 41 may be configured to range from 1 cm to 3 cm. The thickness (t) of a wall of the cell 41 may be configured to be about 1 mm. The height (H) of the cell 41 may be configured to appropriately (e.g., 5 mm to 15 mm) correspond to the thickness of the vacuum insulation member 10a.

The core 40 may be formed through injection molding or bonding. Accordingly, the height (H) (or thickness) of the core 40 can be uniform, making the thickness of the vacuum insulation member 10a uniform.

In addition, after the vacuum insulation member 10a is vacuumized, a generation of creases on the surface of the envelope 20 can be restrained. Accordingly, when the vacuum insulation member 10a is attached to an object (e.g., a wall surface of the main body of a refrigerator), a generation of a defective bonding that the vacuum insulation member 10a is detached from the object due to the creases of the envelope 20 can be prevented.

The filler 50 formed as powder of an inorganic compound having micro pores may be provided at the inner side of the envelope 20. The filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica. Accordingly, a heat transmission at the internal space of the envelope 20 can be restrained. Namely, the internal space of the envelope 20 and the core 70 can be filled with the filler 50 formed as inorganic compound powder, thus lengthening a heat transmission path according to conduction among particles of the filler 50 and restraining a heat transmission due to convection and radiation.

In detail, in the present exemplary embodiment, the use of the glass fiber core is avoided, and the core 40 formed as a structure having a certain shape and the filler 50 of powder having micro pores as an inorganic compound are charged in the interior, thus the internal vacuum degree of the envelope 20 can be maintained to be relatively low (e.g., $10^{-1}$ Torr to 10 Torr). In case of using glass fiber core, a relatively high internal vacuum degree (e.g., $10^{-4}$ Torr to $10^{-2}$ Torr) is required in terms of glass fiber, but in the case of the core 40 according to the present exemplary embodiment, a relatively low vacuum degree (e.g., $10^{-1}$ Torr to 10 Torr) can be maintained.

Thus, when the interior of the envelope 20 is vacuumized, introduction of equipment (vacuum pump, and the like) can be reduced and a tact time can be considerably reduced. In detail, in order to make the interior of the core 20 have the vacuum degree of $10^{-2}$ Torr or lower ($10^{-4}$ Torr to $10^{-2}$ Torr), a very large pumping capacity is required, for which at least three pumps must be connected in series (or by stages). In this case, some of the pumps have a large capacity and are high-priced, and a tact time required for reaching a vacuum degree of a desired level is considerably lengthened, degrading the productivity. In comparison, in the present exemplary embodiment, in order to maintain the vacuum degree of $10^{-2}$ Torr or higher ($10^{-1}$ Torr to 10 Torr) in the interior of the vacuum insulation material 10b, a high capacity, high-priced pump is not required and the vacuum degree of a desired level can be reached within a relatively short time.

In addition, compared with the glass fiber core causing the thickness of the vacuum insulation member to be greatly changed (about 30 percent) after the internal space of an envelope is exhausted and decompressed, there is little change in the thickness of the vacuum insulation member 10a according to the present exemplary embodiment, obtaining the uniform thickness.

In addition, when the envelope 20 is configured, the use of a metal laminated film formed by laminating a metal (aluminum) can be avoided, so a heat transmission by the metal (aluminum) laminated film can be prevented. Here, as for the envelop 20 (deposition film), the thickness (e.g., 0.1 mm) of the deposition layer 25 formed by depositing a metal (Al) or an inorganic material on the outer surface of the film main body 23 made of a synthetic resin material is much smaller than the thickness (e.g., 6 mm) of the aluminum laminated layer, so a heat transmission through the envelope 20 can be effectively prevented.

With such a configuration, when the envelope 20 and the core 40 are formed, the envelope 20 is disposed on an outer surface of the core 40. And then, the filler 50 and/or the getter 55 are disposed at the inner side of the envelope 20. The interior of the envelope 20 is decompressed to maintain a certain vacuum degree, and then the envelop 20 is hermetically sealed.

Figure 3:
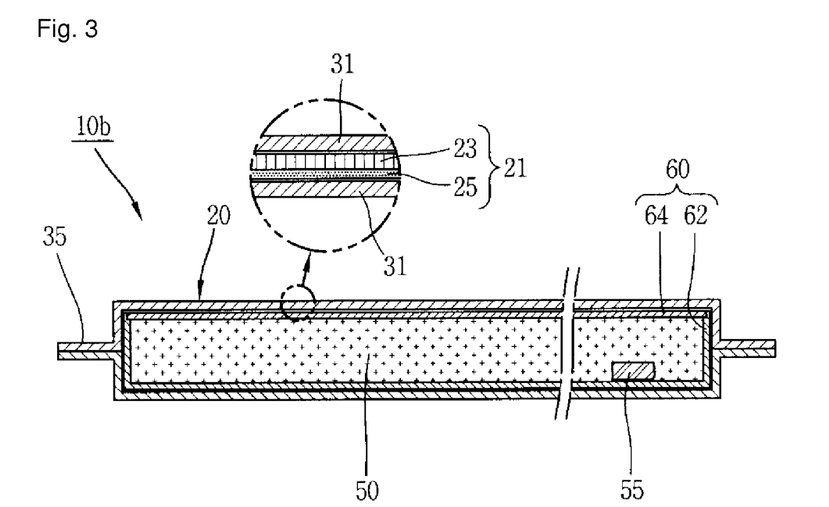
FIG. 3 is a sectional view showing a vacuum insulation member according to a second exemplary embodiment of the present invention.

FIG. 3 is a sectional view showing a vacuum insulation member according to a second exemplary embodiment of the present invention.

The same reference numerals are used for the same and equivalent parts of the foregoing configurations for the sake of explanation of the drawings, and a repeated description of some elements will be omitted.

As shown in FIG. 3, a vacuum insulation member 10b according to the present exemplary embodiment includes an envelope 20 having gas impermeability and having a certain decompressed space therein; a core 60 formed as a structure for maintaining a certain shape and disposed at an inner side of the envelope 20 to support the envelope 20; and a filler 50 formed as powder having micro pores and filled at the inner side of the envelope 20.

The envelope 20 may be configured to have gas impermeability in order to form a decompressed space having a certain vacuum degree ($10^{-1}$ Torr to 10 Torr) therein. The envelope 20 may include a plurality of films 21 and 31 which are laminated to each other. The envelope 20 may be configured to include the film main body 23 formed as a synthetic resin film having gas impermeability and the deposition layer 25 formed by depositing a metal or an inorganic material on the surface of the film main body 23. The envelope 20 may further include resin films 31

The core 60 may be configured to have the shape of a rectangular parallelepiped having an accommodation space formed therein. The core 60 may be configured to include a body 62 with one side open and a cover (lid) 64 for opening and closing the opening of the body 62.

The core 60 may be made of a synthetic resin material. The core 60 may be formed through injection molding. Accordingly, the thickness of the core 60 can be uniformly maintained with a precise dimension, and after the vacuum insulation member 10b is fabricated, a uniform insulation thickness can be obtained. In addition, after the vacuum insulation member 10b is fabricated, a generation of creases on the surface of the envelope 20 can be restrained. Accordingly, a generation of a defective bonding resulting from the creases can be prevented.

The filler 50 formed as powder having micro pores may be provided at the inner side of the envelope 20. Thus, a heat transmission caused by radiation and convection at the inner side of the core 60 can be effectively restrained. In addition, because the filler 50 is formed as powder having micro pores, a heat transmission path between the fillers 50 can be lengthened, restraining a heat transmission between solids.

The filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica.

A getter 55 may be provided at the inner side of the envelope 20 in order to absorb a gas at the inner side of the envelope 20.

Figure 4:
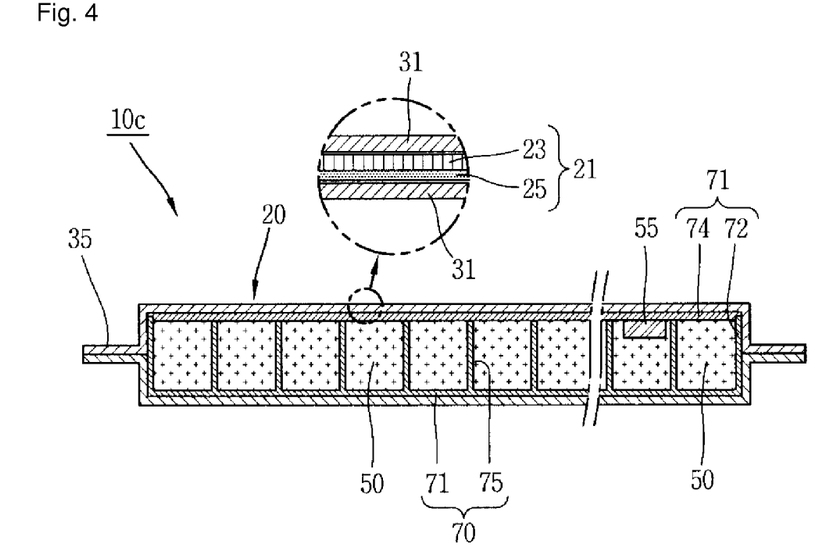
FIG. 4 is a sectional view showing a vacuum insulation member according to a third exemplary embodiment of the present invention.
Figure 5:
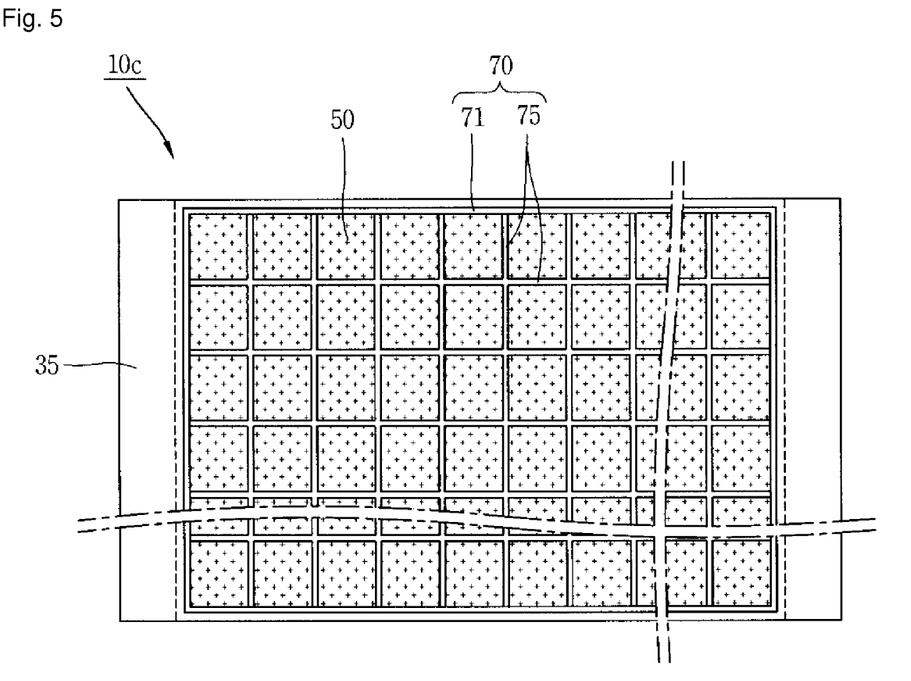
FIG. 5 is a plan view of a core of FIG. 4.

FIG. 4 is a sectional view showing a vacuum insulation member according to a third exemplary embodiment of the present invention, and FIG. 5 is a plan view of a core of FIG. 4.

As shown in FIG. 4, vacuum insulation member 10c according to the present exemplary embodiment includes the envelope 20 having gas impermeability and having a certain decompressed space therein; a core 70 formed as a structure for maintaining a certain shape and disposed at an inner side of the envelope 20 to support the envelope 20; and the filler 50 formed as powder having micro pores and filled at the inner side of the envelope 20.

The envelope 20 may be configured to have gas impermeability in order to form a decompressed space having a certain vacuum degree ($10^{-1}$ Torr to 10 Torr) therein. The envelope 20 may include a plurality of films 21 and 31 which are laminated to each other. The envelope 20 may be configured to include the film main body 23 formed as a synthetic resin film having gas impermeability and the deposition layer 25 formed by depositing a metal or an inorganic material on the surface of the film main body 23. A junction part 35 may be formed on at least one side of the envelope 20. The envelope 20 may further include a plurality of resin films 31.

The core 70 may be configured to include a core main body 71 having a box-like shape and a plurality of ribs 75 disposed in a thicknesswise direction at an inner side of the core main body 71. Accordingly, the use of a glass fiber core can be avoided. The core main body 71 may be configured to include a body 72 with one side open and a cover 74 for opening and closing the opening of the body 72. The core 70 may be made of a synthetic resin material. The core 70 may be formed through injection molding.

A plurality of ribs 75 may be provided at the inner side of the body 72. As shown in FIG. 5, the ribs 75 may be disposed at a right angle to each other. Here, the thickness of the body 72, the cover 74, and the rib 75 may be about 1 mm or some. In addition, a plurality of ribs 75 may be formed to suitably demarcate the internal space in consideration of the thickness, a vacuum degree, and the like, of the vacuum insulation member 10c. In the present exemplary embodiment, the space demarcated by the ribs 75 forms regular squares each having one side of about 10 cm.

The getter 55 may be provided at the inner side of the envelope 20 in order to absorb a gas at the inner side of the envelope 20.

The filler 50 formed as powder of an inorganic compound having micro pores may be provided at the inner side of the core 70. Thus, a heat transmission caused by radiation and/or convection at the inner side of the envelope 20 can be restrained. In addition, a heat transmission between powder particles of the filler 50 can be restrained. Here, the filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica.

Figure 6:
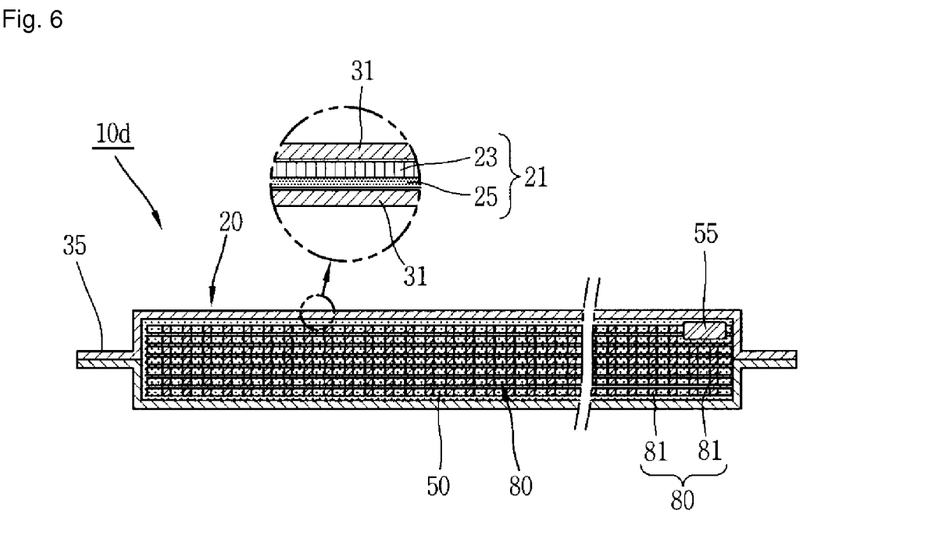
FIG. 6 is a sectional view showing a vacuum insulation member according to a fourth exemplary embodiment of the present invention.
Figure 7:
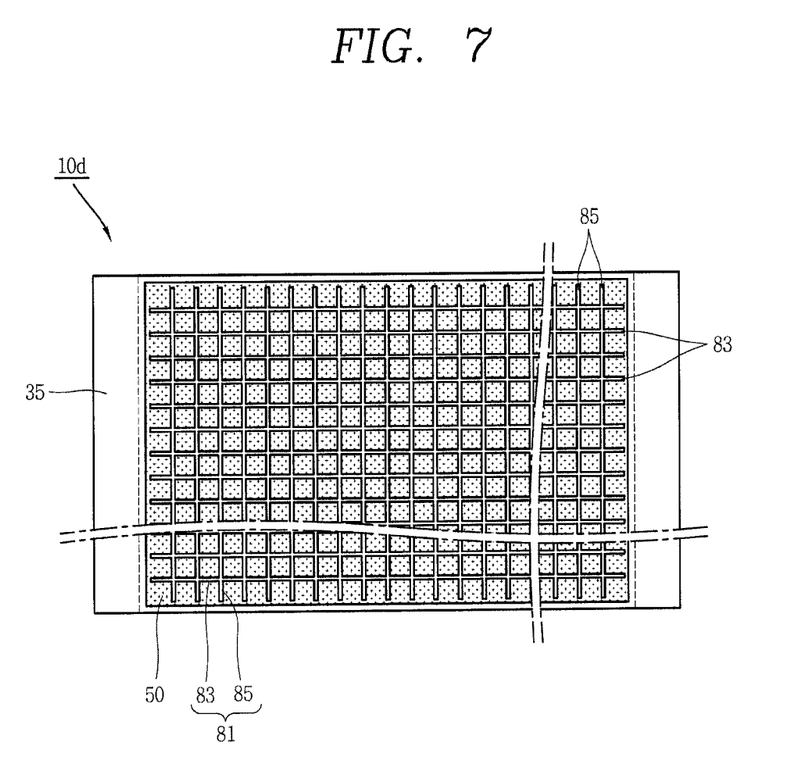
FIG. 7 is a plan view of a core of FIG. 6.
Figure 8:
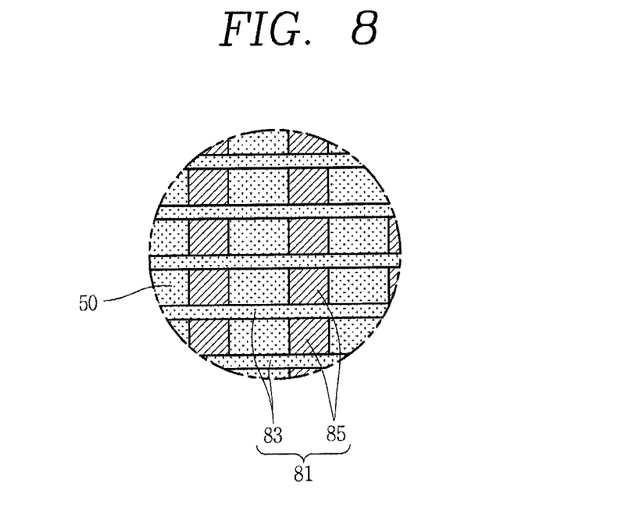
FIG. 8 is an enlarged view of the core of FIG. 6.

FIG. 6 is a sectional view showing a vacuum insulation member according to a fourth exemplary embodiment of the present invention, FIG. 7 is a plan view of a core of FIG. 6, FIG. 8 is an enlarged view of the core of FIG. 6, and FIGS. 9 to 12 are views explaining variants of the core of FIG. 6.

As shown in FIGS. 6 to 8, vacuum insulation member according to the present exemplary embodiment includes the envelope 20 having gas impermeability and having a certain decompressed space therein; a core 80 formed as a structure for maintaining a certain shape and disposed at an inner side of the envelope 20 to support the envelope 20; and the filler 50 formed as powder having micro pores and filled at the inner side of the envelope 20.

The envelope 20 may be configured to have gas impermeability in order to form a decompressed space having a certain vacuum degree ($10^{-1}$ Torr to 10 Torr) therein. The envelope 20 may include a plurality of films 21 and 31 which are laminated to each other. The envelope 20 may be configured to include the film main body 23 formed as a synthetic resin film having gas impermeability and the deposition layer 25 formed by depositing a metal or an inorganic material on the surface of the film main body 23. The envelope 20 may further include the resin films 31.

The filler 50 formed as powder of an inorganic compound having micro pores may be provided at the inner side of the envelope 20. Thus, a heat transmission at the inner space of the envelope 20 can be restrained. Namely, a heat transmission caused by radiation and/or convection at the inner side of the envelope 20 and a heat conduction between particles of the filler 50 can be restrained.

Here, the filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica.

The getter 55 may be provided at the inner side of the envelope 20 in order to absorb a gas at the inner side of the envelope 20.

The core 80 may be configured to have mesh members 81 having certain meshes. The mesh members 81 may be configured to be laminated to each other in a thicknesswise direction. Thus, the use of a glass fiber core can be avoided.

The mesh member 81 may be made of a synthetic resin material. Thus, the thickness of the core 80 can be uniformly maintained.

As shown in FIGS. 7 and 8, the mesh member 81 may be configured to include a plurality of first frame 83 and second frame 85 disposed to be perpendicular to each other. The first frame 83 and the second frame 85 may be disposed on the same plane.

Here, the interval and thickness (width) of the first frame 83 and the second frame 85 may be appropriately adjusted in consideration of the thickness, the internal vacuum degree, and the like, of the vacuum insulation member 10d.

In the present exemplary embodiment, the interval of the first frame 83 and the second frame 85 is about 1 cm to 2 cm, and the thickness (width) of the first frame 83 and the second frame 85 is about 1 mm.

Figure 9:
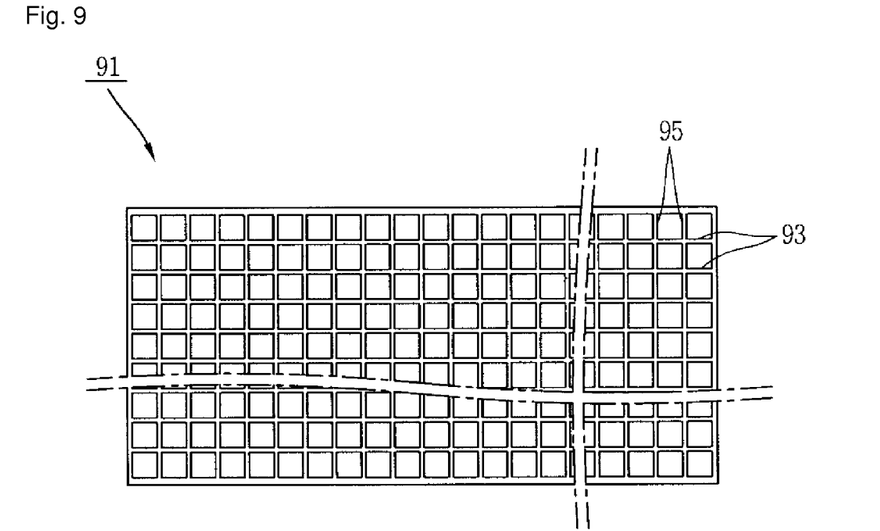
FIGS. 9 to 12 are views explaining variants of the core of FIG. 6.
Figure 10:
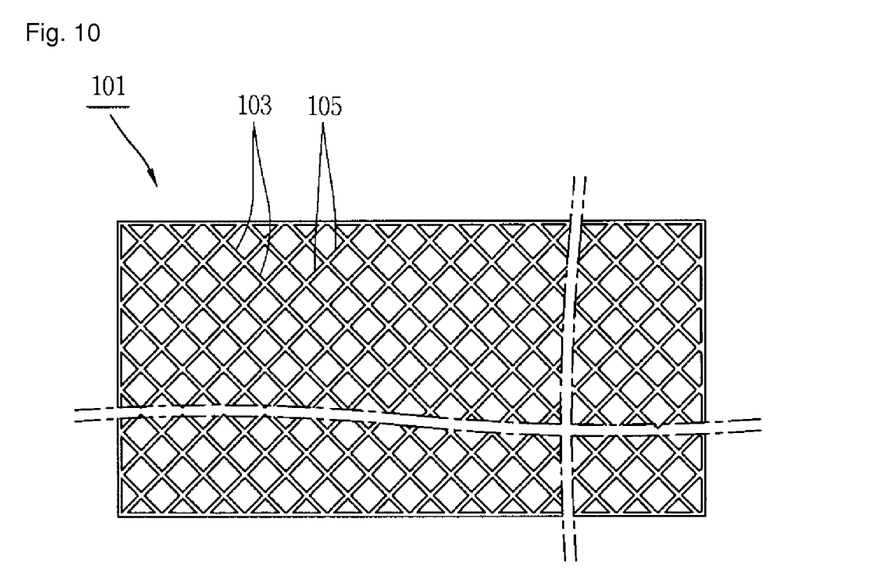

As shown in FIGS. 9 and 10, as for the core 80, the first frames 93 and 103 and the second frames 95 and 105 of two mesh members 91 and 101, which are laminated up and down, are arranged in different directions, and the first mesh member 91 and the second mesh member 101 may be alternately laminated.

As shown in FIG. 9, the first mesh member 91 may be configured to include a plurality of first frames 93 and a plurality of second frames 95 which are parallel to the outlines of the first mesh member 91 and disposed to be perpendicular to each other.

In comparison, as shown in FIG. 10, the second mesh member 101 may be configured to include a plurality of first frames 103 and a plurality of second frames 105 which are sloped to the outlines of the second member 101 and disposed to be perpendicular to each other.

Here, the thickness (width) of the first frames 93 and 103 and the second frames 95 and 105 of the first mesh member 91 and the second mesh member 101 may be about 1 mm, and the interval therebetween may range from 1 cm to 2 cm.

Accordingly, when the first mesh member 91 and the second mesh member 101 are laminated, a heat transmission between the first mesh member 91 and the second mesh member 101 can be restrained. Namely, if the first frame and the second frame of the first mesh member 91 and the second mesh member 101 are laminated to correspond to each other, a heat transmission could be easily made due to conduction by an intersolid contact, but in the present exemplary embodiment, because the first frames 93 and 103 and the second frames 95 and 105 of the first mesh member 91 and the second mesh member 101 are disposed in a crisscross manner, the inter-solid contact can be reduced to effectively restrain a heat transmission according to conduction.

Figure 11:
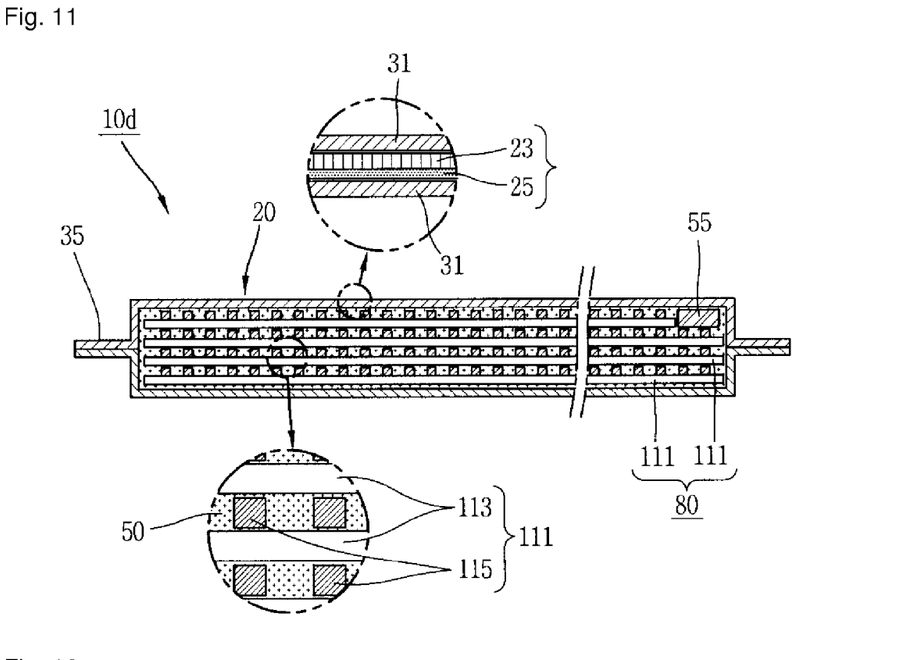
Figure 12:
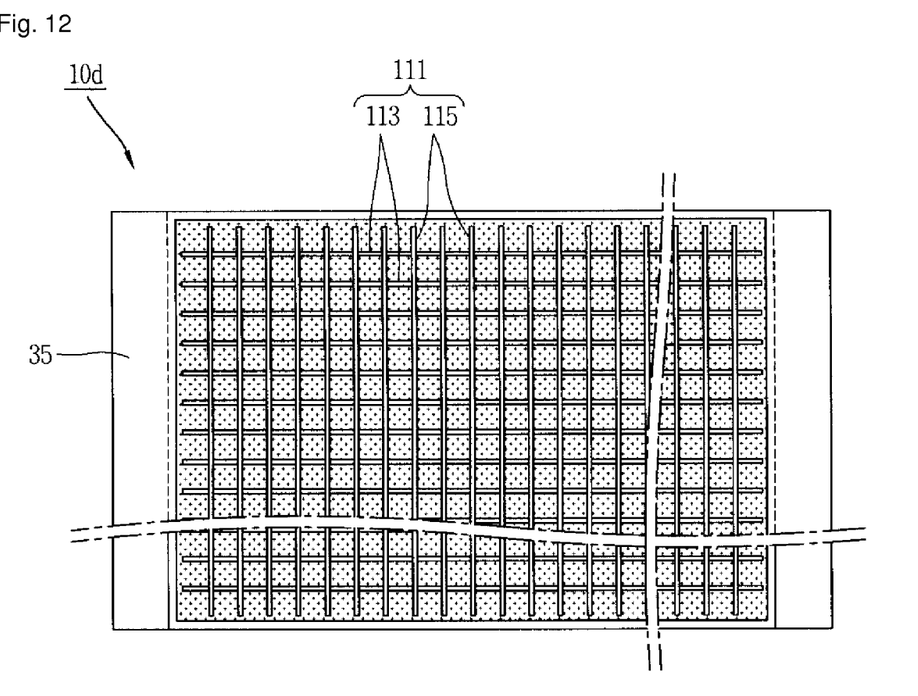

As shown in FIGS. 11 and 12, the core 80 may be configured by laminating a plurality of mesh members 111, and the mesh members 111 may be configured to include a plurality of first frames 113 disposed to be parallel to each other on the same plane and a plurality of second frames 115 disposed to be spaced apart at a certain interval such that they are perpendicular to the first frames 113 with a height difference from the first frames 113.

The mesh members 111 may be made of a synthetic resin material through injection molding. Here, the thickness (width) of the first frame 113 and the second frame 115 may be about 1 mm, and the interval therebetween may range from 1 cm to 2 cm.

A refrigerator having a vacuum insulation member according to an exemplary embodiment of the present invention will now be described with reference to FIG. 13.

Figure 13:
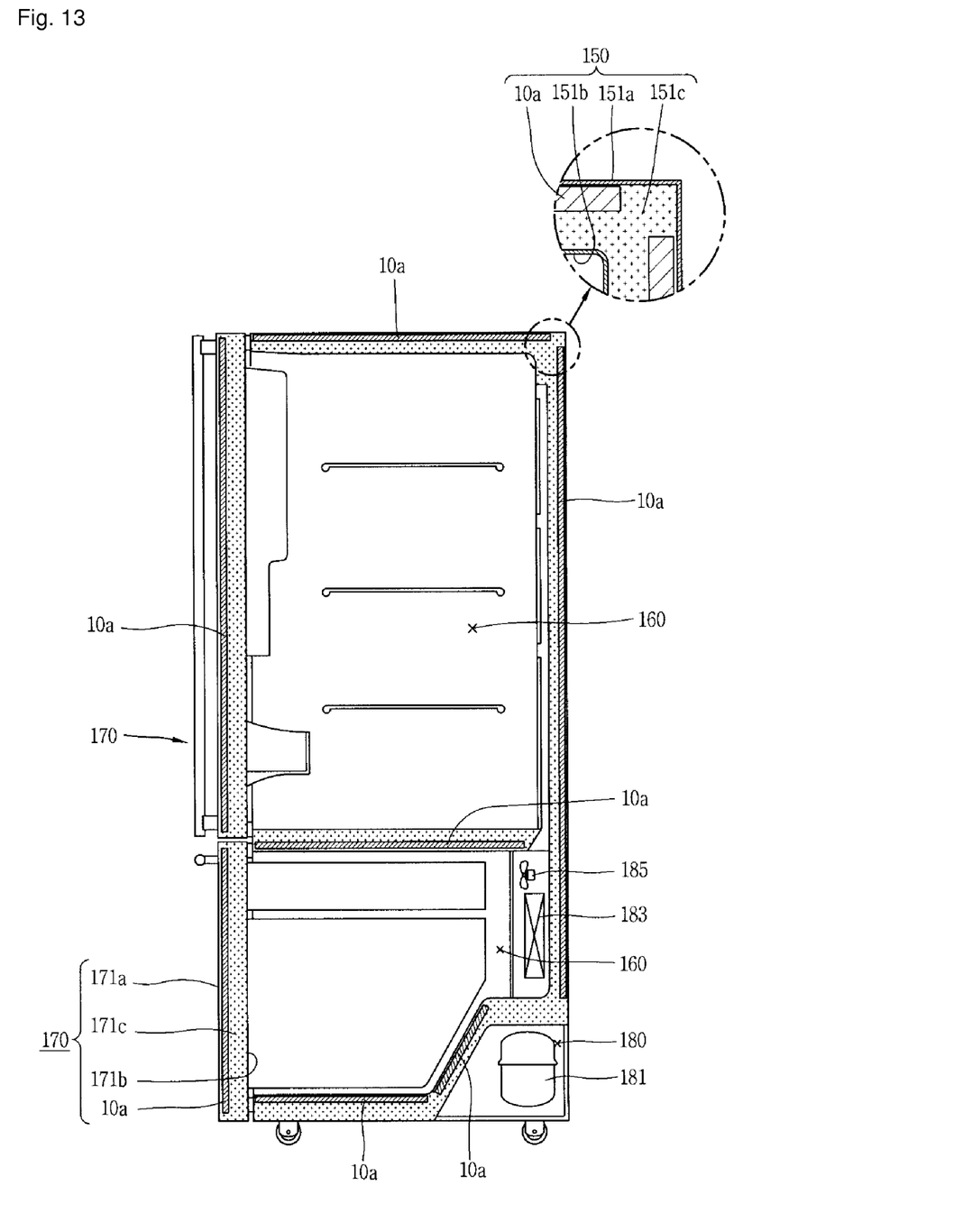
FIG. 13 is a sectional view of a refrigerator having a vacuum insulation member according to an exemplary embodiment of the present invention.

FIG. 13 is a sectional view having a vacuum insulation member according to an exemplary embodiment of the present invention.

As shown in FIG. 13, a refrigerator having a vacuum insulation member may be configured to include a refrigerator main body 150 forming a cooling chamber therein, a door 170 for opening and closing the cooling chamber 160, and a vacuum insulation member 10a provided at the refrigerator main body 150 or the door 170. Here, the cooling chamber 160 is a general term for a freezing chamber and a refrigerating chamber, and the refrigerator main body 150 may be configured to include one of the freezing chamber and refrigerating chamber.

The vacuum insulation member 10a may be configured to include the envelope 20 having gas impermeability and having a certain decompressed space therein, the core 40 formed as a structure for maintaining a certain shape and disposed at an inner side of the envelope 20 to support the envelope 20, and the filler 50 formed as powder having micro pores and filled at the inner side of the envelope 20. Here, the vacuum insulation member 10a may be configured to have the configuration of the vacuum insulation members 10a to 10d as described above with reference to FIGS. 1 to 12.

The refrigerator main body 150 includes an outer case 151a forming an external appearance and an inner case disposed to be spaced apart with a charging interval of an insulation member 151c at an inner side of the outer case 151a and forming the cooling chamber 160 therein.

The refrigerator main body 150 may include a refrigerating cycle for providing cooling air to the cooling chamber 160. A mechanic chamber 180 may be formed at a lower region of a rear side of the refrigerator main body 150. The mechanic chamber 180 may include a partial configuration of the refrigerating cycle including a compressor 181, a condenser, and the like, and an evaporator 183 may be provided at one side of the interior of the cooling chamber 160. A cooling fan 185 may be provided at one side of the evaporator 183.

The vacuum insulation member 10a may be provided on at least one side wall of the refrigerator main body 150. Thus, the thickness of the corresponding side wall can be reduced, and accordingly, the internal space of the refrigerator can be increased as much with the same external appearance (size) maintained.

The door 170 may include an outer door plate 171a forming an external appearance and an inner door plate 171b spaced apart with a charging interval of the insulation member 171c from the outer door plate 171a at an inner side of the outer door plate 171a.

The door 170 may include the vacuum insulation member 10a. The vacuum insulation member 10a may be provided between the outer door plate 171a and the inner door plate 171b. Accordingly, the usage amount of the insulation member 171c of the door 170 can be reduced, and the thickness of the door 170 can be also reduced.

Here, because the vacuum insulation member 10a may be configured such that the envelope 20 is supported by the core 40 formed as a structure having a certain shape, the vacuum insulation member 10a can have a uniform thickness. Thus, because the uniform vacuum insulation thickness is secured, the thickness of the side wall of the refrigerator can be reduced as much. Namely, in the related art vacuum insulation member, it has a large thickness deviation, so the thickness of the foaming agent is set based on the smallest portion of the thickness of the vacuum insulation member, causing a problem in that the thickness of the side wall of the cooling chamber 160 increases overall. In comparison, however, according to the present exemplary embodiment, the vacuum insulation member 10a has a uniform thickness, so the side wall of the cooling chamber 160 can be formed to be thinner overall, and thus, the internal space of the refrigerator can be increased as much.

In addition, because the vacuum insulation member 10a may be configured such that the envelope 20 is supported by the core 20 formed as a structure having a certain shape, a generation of creases on the surface of the envelope 20 can be restrained. Thus, when the vacuum insulation member 10a is bonded to an object, a defective bonding caused by a generated crease can be restrained.

In more detail, when the refrigerator main body 150 is fabricated, the vacuum insulation member 10a is disposed between the outer case 151a and the inner case 151b and fixed to one of the outer case 151a and the inner case 151b before a foaming operation of the refrigerator main body 150. When the vacuum insulation member 10a is fixed, the foaming agent (polyurethane, and the like) is injected between the outer case 151a and the inner case 151b.

The foaming agent injected into the interior between the outer case 151a and the inner case 151b expands while flowing within the internal space between the outer case 151a and the inner case 151b. In this case, because there is little creases on the surface of envelope of the vacuum insulation member 10a, vacuum insulation member 10a can be completely tightly attached to the surface of the object (e.g., the outer case 151a or the inner case 151b). Accordingly, the foaming agent is prevented from being introduced to between the vacuum insulation member 10a and the object, restraining a generation of a defective bonding that the vacuum insulation member 10a is detached from the object. In comparison, in the related art vacuum insulation member, because creases are generated on the envelope, when the vacuum insulation member is attached to the surface of the object (the outer case 151a or the inner case 151b), a gap due to the creases is generated between the vacuum insulation member and the object and the foaming agent will be introduced through the gap so as to be expanded, causing the defective attachment problem in that the vacuum insulation member is separated from the surface of the object.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A vacuum insulation member comprising:
   an envelope having gas impermeability and having a decompressed space formed therein;
   a core provided in the space formed in the envelope and having a structure configured to maintain a certain shape so as to support the envelope; and
   a filler comprising a powder having micro pores and filled in the space formed in the envelope,
   wherein the core comprises a plurality of mesh members laminated to each other.

2. The vacuum insulation member of claim 1, wherein the plurality of mesh members are laminated to each other in a thickness direction of the core.

3. The vacuum insulation member of claim 1, wherein the plurality of mesh members comprises a plurality of first and second frames disposed perpendicular to each other.

4. The vacuum insulation member of claim 3, wherein the plurality of first and second frames are disposed on the same plane.

5. The vacuum insulation member of claim 1, wherein the plurality of mesh members comprises a first mesh member and a second mesh member alternately laminated.

6. The vacuum insulation member of claim 5, wherein the first mesh member comprises a plurality of first frames and a plurality of second frames which are disposed perpendicular to each other and are each oriented in parallel to a corresponding periphery of the first mesh, and
   the second mesh member comprises a plurality of third frames and a plurality of fourth frames which are disposed perpendicular to each other and are each oriented at a predetermined angle with respect to a corresponding periphery of the second member and disposed to be perpendicular to each other.

7. The vacuum insulation member of claim 1, wherein the core is made of a synthetic resin material.

8. The vacuum insulation member of claim 1, wherein the filler comprises at least one of $SiO_2$, $TiO_2$, or $Al_2O_3$.

9. The vacuum insulation member of claim 8, wherein an internal vacuum degree of the envelope ranges from $10^{-1}$ Torr to 10 Torr.

10. The vacuum insulation member of claim 9, wherein the envelope comprises a film body and a deposition film having a metal or inorganic deposition layer deposited on a surface of the film body.

11. The vacuum insulation member of claim 8, further comprising:
    a getter disposed in the space formed in the envelope.

12. A refrigerator comprising the vacuum insulation member of claim 1.

13. A method for fabricating a vacuum insulation member, the method comprising:
    forming an envelope having gas impermeability and a core, the core having a structure configured to maintain a certain shape and being disposed in a space formed in the envelope to support the envelope;
    filling a filler comprising a powder having micro pores in the space formed in the envelope; and
    decompressing the space formed in the envelope to maintain the space at a certain vacuum degree,
    wherein forming a core comprises laminating a plurality of mesh members.

14. The method of claim 13, wherein laminating a plurality of mesh members comprises laminating a plurality of mesh members to each other in a thickness direction of the core.

15. The method of claim 13, wherein laminating a plurality of mesh members comprises laminating a plurality of first and second frames perpendicular to each other.

16. The method of claim 15, wherein the plurality of first and second frames are disposed on the same plane.

17. The method of claim 13, wherein laminating a plurality of mesh members comprises alternately laminating a first mesh member and a second mesh member.

18. The method of claim 17, wherein the first mesh member comprises a plurality of first frames and a plurality of second frames which are disposed perpendicular to each other and are each oriented in parallel to a corresponding periphery of the first mesh member, and
    the second mesh member comprises a plurality of third frames and a plurality of fourth frames which are disposed perpendicular to each other and are each oriented at a predetermined angle with respect to a corresponding periphery of the second member.

* * * * *